Aug. 9, 1966 D. J. LASKY 3,265,518

METHOD FOR INTENSIFYING IMAGES TO BE READ BY OPTICAL READERS

Filed Dec. 30, 1963 4 Sheets-Sheet 1

INVENTOR
DANIEL J. LASKY
BY Donald F Voss
ATTORNEY

Aug. 9, 1966 D. J. LASKY 3,265,518

METHOD FOR INTENSIFYING IMAGES TO BE READ BY OPTICAL READERS

Filed Dec. 30, 1963 4 Sheets-Sheet 3

Aug. 9, 1966 D. J. LASKY 3,265,518
METHOD FOR INTENSIFYING IMAGES TO BE READ BY OPTICAL READERS
Filed Dec. 30, 1963 4 Sheets-Sheet 4

PRIOR TO TREATMENT

AFTER TREATMENT

United States Patent Office 3,265,518 Patented August 9, 1966

3,265,518

METHOD FOR INTENSIFYING IMAGES TO BE READ BY OPTICAL READERS

Daniel J. Lasky, Rochester, Minn., assignor to International Business Machines Corporation, New York, N.Y., a corporation of New York Filed Dec. 30, 1963, Ser. No. 334,295
6 Claims. (Cl. 117—2)

This invention relates to a method for decreasing the overall reflectance of characters printed under impact from a fabric inked ribbon and thereby intensify the optical density of the characters to enhance recognition thereof by optical character readers.

In many optical character readers the source document to be read is flooded with light from a light source. Reflection of light from the document is directed into a lens system which transmits the light to a scanner. The scanner views the characters and by means of a light sensitive device, such as a photomultiplier tube, the reflected light from a character is converted into electrical impulses. These electrical impulses are then utilized to identify the character.

In order to properly identify the characters, the electrical signals generated in response to scanning the character must be distinguishable from those electrical signals developed by light reflected from the background media. The amount of light reflected by a character is much less than that reflected by the background media. The printed characters absorb light in relationship to their density. Hence, the overall density of a character is a very important consideration with regard to its recognition by an optical character reader. Light printing and voids in the characters cause recognition failures in the optical character readers because the electrical signals generated by the background media surrounding a lightly printed character and appearing within a character through voids thereof are not easily distinguishable from those electrical signals generated by the character.

The electrical signals generated by the background media and voids within a character are defined as "noise" signals. These noise signals can be clipped; however, there must be sufficient difference between their amplitude and the amplitude of signals generated by the characters to enable recognition.

If the voids within a character are filled in and the overall density of a character is increased, the character signal to noise ratio will be increased significantly because the amplitude of the signals generated by the characters will increase while the amplitude of the noise signals will decrease. This will enable more characters to be recognized.

It has been found that characters printed from fabric inked ribbons, particularly under impact, contain undissolved ink dye particles which come from the ribbon. The ribbons contain more dye particles than the vehicle can dissolve. By proper application of a solvent for the dye particles to the characters, the undissolved dye particles go into solution. The now dissolved dye particles or dye solution spreads or "bleeds" throughout the character, filling in voids and otherwise coloring the background media, such as paper, to increase the overall density of the character. Application of the solvent is controlled because over-treatment tends to bleed the surface ink and dissolved dye particles into the interior of paper thereby resulting in a less dense character.

Treatment of documents according to this invention has reduced the reflectivity of characters on the document between 13% and 27%. Correspondingly, the document reject rate by a particular optical character reader was reduced approximately 50% on one particular set of documents.

Accordingly, the prime object of the invention is to provide a method for decreasing the reflectance of light from characters printed from fabric ink ribbons to enhance recognition of the characters by optical character readers.

A more specific object of the invention is to provide a method for intensifying the optical density of characters by applying a solvent to the dye particles forming the characters whereby previously undissolved dye particles go into solution and spread over the character.

The foregoing and other objects, features and advantages of the invention will be apparent from the following more particular description of preferred embodiments of the invention, as illustrated in the accompanying drawings.

Figure 1:
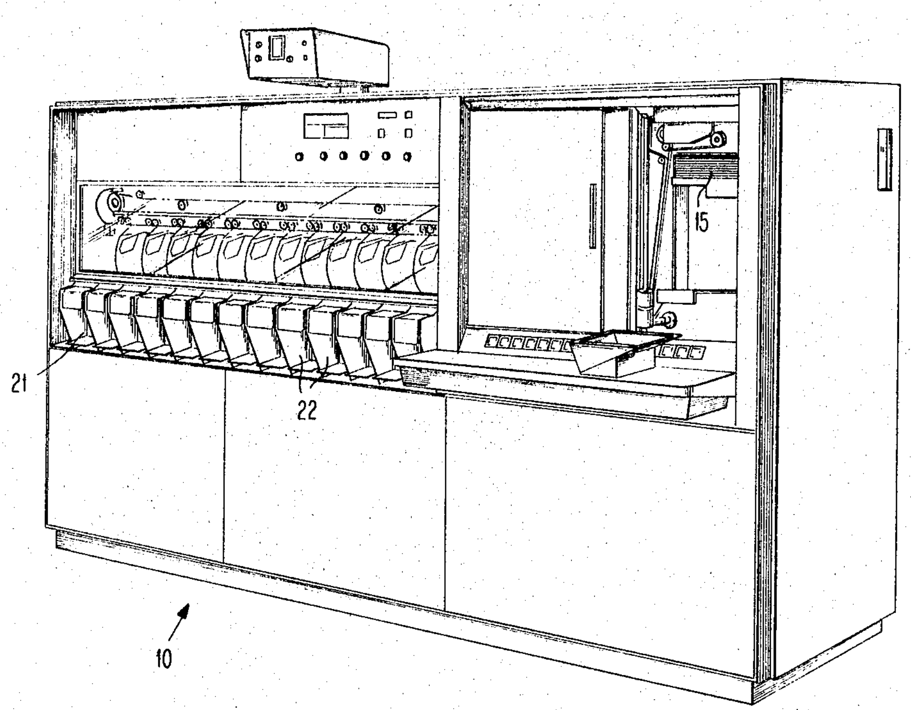
FIG. 1 is a perspective view of an optical character reader having the facility for distributing the documents read to different pockets, one of the pockets is a reject pocket for collecting those documents having characters which could not be recognized by the reader.
Figure 5:
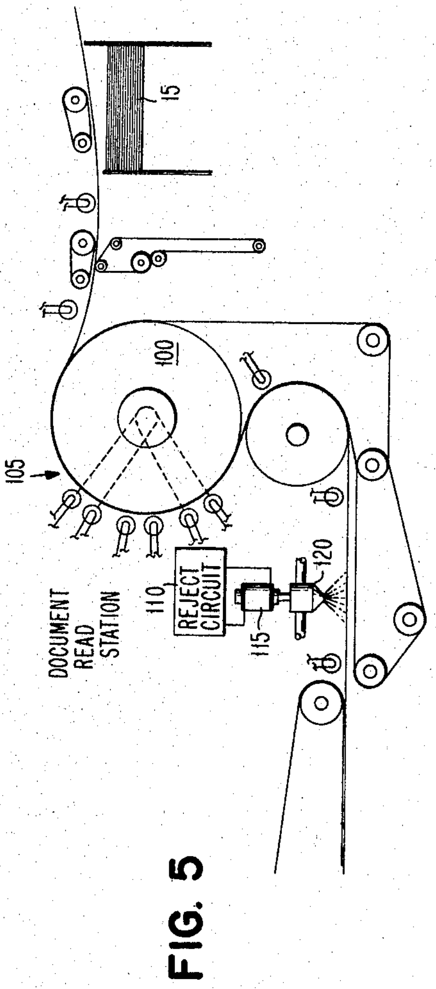
FIG. 5 is a schematic illustration of a portion of an optical character reader sorter having selectively operable apparatus for applying the solvent to those documents containing characters which could not be recognized by the optical reader.

With reference to the drawings, FIG. 1 illustrates a machine 10 known as the IBM 1418 Optical Character Reader Model 2. Documents 15 entered into the machine are read optically and sorted into various sorting pockets 20 according to various information contained by the documents. However, those documents which cannot be read because of light printing and voids are distributed to a reject pocket 21. The rejected documents are treated with a solvent of the ink dye particles by apparatus illustrated in FIGS. 2, 3, 4 and 5. The treated documents are then re-entered into the Optical Character Reader. Treatment of all documents prior to the reading and sorting operation is possible; however, it may be preferable to treat only those documents having characters which cannot be read. In FIG. 5, the documents are treated selectively so as to treat only the rejected or non-readable documents as will be described later herein.

Several solvents are suitable and good results have been achieved with a solvent consisting of by volume:

| | Percent |
|---|---|
| Trichloroethylene | 80 |
| Ethanol | 14.25 |
| Methanol | .75 |
| 1,1,2-trichloro-1,2,2-trifluoroethane | 5 |

Figure 2:
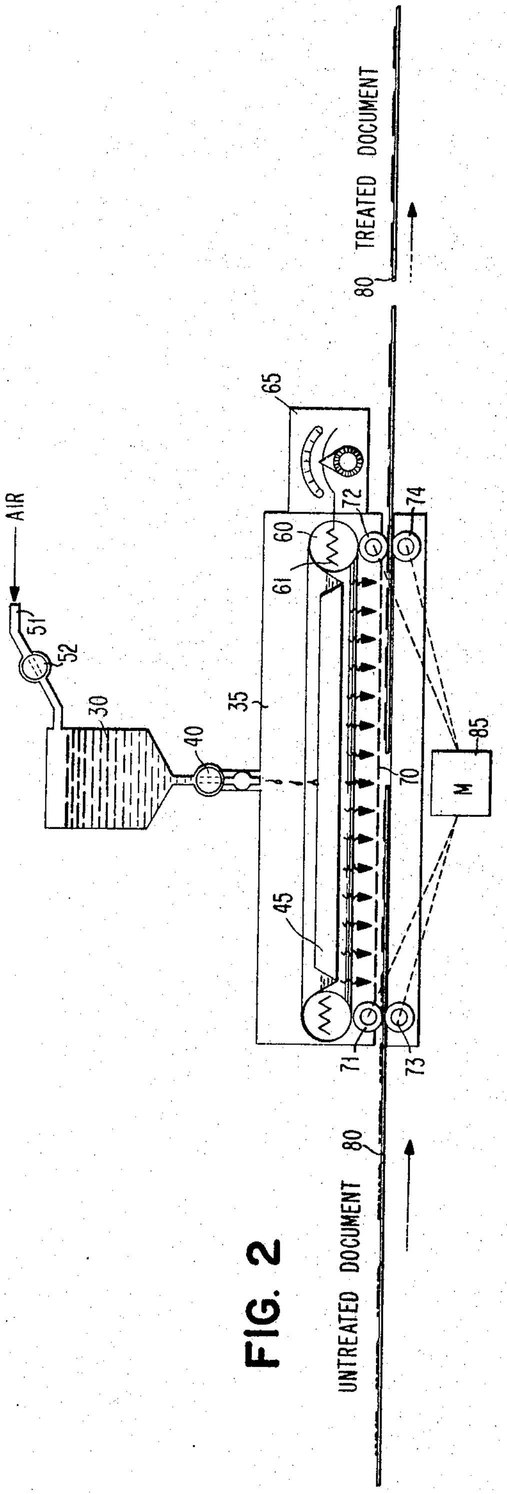
FIG. 2 is a schematic illustration of apparatus for applying solvent in vapor form to a document.

In FIG. 2 the solvent is contained in a bottle 30 which is inverted and placed into housing 35 to be supported thereby. A pipet type valve 40 is connected to or integral with the mouth of bottle 30. When valve 40 is turned to the open position, as shown, solvent is permitted to flow from bottle 30 in droplets into a heated V-shaped trough 45. An air inlet 51 is connected to bottle 30 by means of a pipet valve 52. This arrangement permits control of the flow of droplets by adjusting the amount of air permitted to enter bottle 30. In this example, trough 45, made of metal, is heated by conduction. Trough 45 is hooked onto a metal tube 60 enclosing a heating element 61. The details concerning the actual mounting for the trough 45 and heating element 61 are omitted because they are within the scope of a man skilled in the art. The heating element 61 is attached by a suitable conductor to an electrical power supply 65 and the current furnished to the heating element 61 can be varied to adjust it to the proper temperature for vaporizing the solvent.

The heated trough 45 functions to vaporize the solvent which passes from housing 35 through a perforated metal plate 70 fixed within the housing 35. The solvent is heated to approximately 2 to 3 degrees above its boiling temperature.

The perforated plate 50 is suitably notched to permit upper feed rollers 71 and 72 to extend therethrough. Feed rollers 71 and 72 cooperate with lower feed rollers 73 and 74 respectively to feed documents 80. Housing 35 is slotted to permit the entry of documents 80, which in this example, are hand inserted. Of course, automatic mechanical feeders could be used. The feed rollers 71, 72, 73, 74 are driven from the same drive source 85 the speed of which is controllable. The time interval during which a document is exposed to the solvent vapor is dependent upon the document feeding speed.

The solvent vapor collects upon the surface of documents 80 to cause undissolved ink dye particles to go into solution. The dye particles from fabric ink ribbons are usually either oil soluble or spirit soluble. The solvent described above will dissolve both oil and spirit soluble dye particles.

As the undissolved dye particles go into solution, the dye spreads around the character filling in voids and distributing itself over the character to provide more uniform optical density.

The documents should not be over-exposed to the solvent vapor because then the dye tends to penetrate into the interior of the paper and a less dense character results. The exposure varies, depending upon concentration of the solvent vapor and its application. Solvent discharge under pressure as shown in FIGS. 3 and 5 causes the undissolved dye particles to go into solution quite rapidly.

Figure 3:
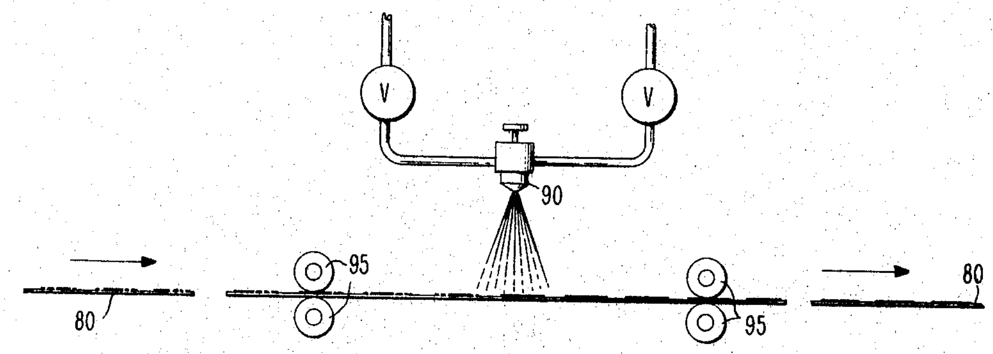
FIGS. 3 and 4 are schematic illustrations of alternative forms of apparatus for applying solvent to documents.

In FIG. 3, a solvent is discharged under pressure from valve 90 in a fine mist or vapor. The vapor is directed against documents 80 in any desired spray pattern. Nozzles, such as nozzle 90, are commercially available and can be obtained in a wide variety of types so as to provide different spray patterns. The documents 80 are transported relative to nozzle 90 by means of a pair of spaced, cooperating feed rollers 95.

Documents 15 in FIG. 5 are tranpsorted onto a drum 100 at a document read station 105. Those documents 15 containing characters which cannot be read are treated. The information indicating that document contains characters which cannot be read is transferred to a reject circuit symbolically illustrated by block 110. This information is used to control solenoid 115 for operating valve 120 from which the solvent is discharged in vapor form in a manner similar to valve 90 in FIG. 3. By this arrangement, only those documents containing characters which cannot be read are treated. It should be noted that apparatus would be provided for determining when the document containing the characters which cannot be read comes into position for receiving ink solvent vapor discharged by nozzle 120.

Figure 4:
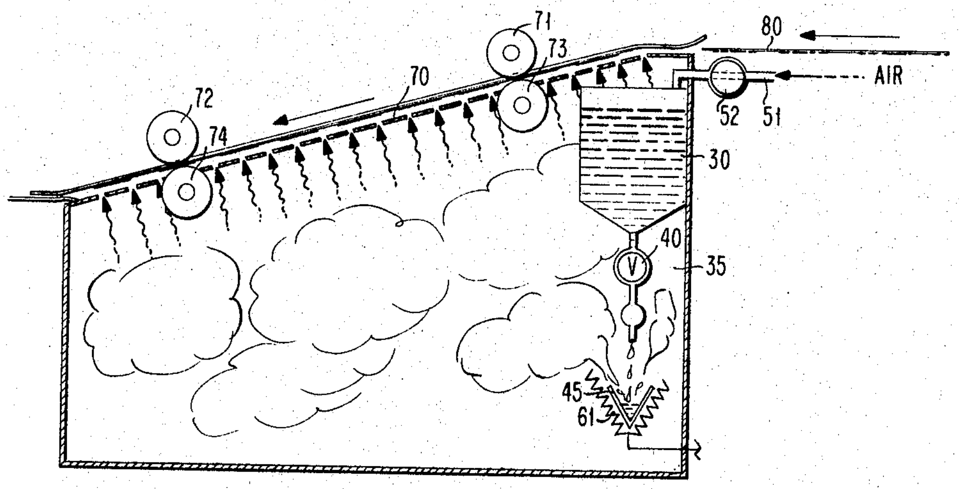

The apparatus in FIG. 4 for applying solvent in the form of vapor to a document is quite similar to the apparatus shown in FIG. 2. The solvent vapor in FIG. 4 rises within the housing so as to pass through a perforated plate and come into contact with the documents 80. Otherwise, the apparatus shown in FIG. 4 is substantially similar to that shown in FIG. 2 and the details thereof require no further explanation.

Figure 6:
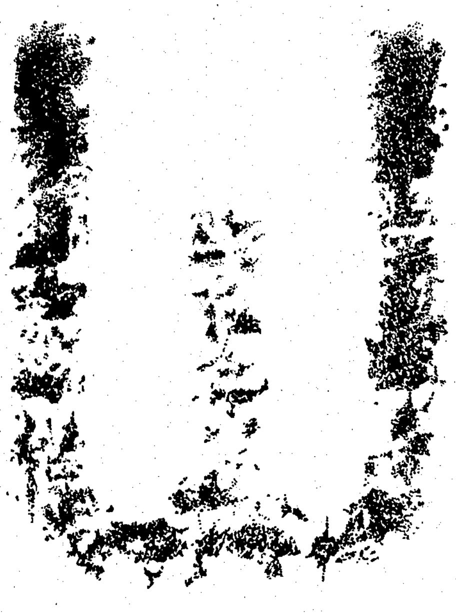
FIG. 6 is a photomicrograph view illustrating a character before the application of solvent.
Figure 7:
FIG. 7 is a photomicrograph view illustrating the character of FIG. 6 after it has been treated with a solvent.

In FIG. 6, the lower case character w is shown as it appears in a greatly enlarged form. The character has not been treated with any solvent vapor. However, the character contains undissolved ink dye particles. It is seen that there are some voids within the character and the character is quite faint in many areas. After treatment of the same character shown in FIG. 6 with the vapor solvent applied thereto in a manner indicated above, some of the voids are filled in and the optical density of the character is intensified as shown in FIG. 7.

From the foregoing, it is seen that this invention provides a method for decreasing the overall reflectance of characters printed under impact from a fabric ink ribbon and thereby intensifies the optical density of the characters to enhance recognition thereof by optical character readers.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for intensifying the optical density of characters printed upon documents from a fabric ink ribbon which comprises:
   sorting out documents which cannot be read by an optical character reader, and
   applying a solvent of the ink dye particles in the form of a vapor to the characters on the sorted-out documents in an amount to dissolve the undissolved dye particles within said characters without the dye penetrating into the interior of said documents so the then dissolved dye particles become distributed within the characters.

2. A method for intensifying the optical density of characters printed upon documents from a fabric ink ribbon which comprises:
   passing said documents through an optical character reader-sorter,
   identifying those documents which cannot be read by said reader-sorter,
   applying a solvent of the ink dye particles in the form of a vapor to said identified documents in an amount to dissolve said undissolved dye particles without the dye penetrating into the interior of said documents, and
   collecting said solvent-treated identified documents so the same can again be passed through said reader-sorter.

3. A method for intensifying the optical density of characters printed upon documents from a fabric ink ribbon which comprises:
   forming a vapor of a solvent for ink dye particles, and
   applying said solvent vapor to a document containing printed characters having undissolved dye particles in an amount to dissolve said undissolved dye particles without the dye penetrating into the interior of said document so the then dissolved dye particles become distributed within the characters on said document.

4. A method for intensifying the optical density of characters printed upon documents under impact from a fabric ink ribbon which comprises:
   forming a vapor from a solvent consisting of by volume of approximately 80% trichloroethylene, 14.25% ethanol, 0.75% methanol and 5% 1,1,2-trichloro-1,2,2-trifluroethane; and
   applying said solvent vapor to a document containing printed characters having undissolved dye particles in an amount to dissolve said undissolved dye particles without the dye penetrating into the interior of said document so the then dissolved dye particles become distributed within the characters.

5. The method of claim 4 wherein the forming of the vapor is accomplished by heating the solvent within a vapor chamber to approximately 2 to 3 degrees above its boiling temperature.

6. The method of claim 4 wherein the forming of a vapor is accomplished by discharging said solvent under pressure from a valve in a fine mist directly onto the printed characters.

References Cited by the Examiner

UNITED STATES PATENTS

| | | | |
|---|---|---|---|
| 2,182,672 | 12/1939 | Lowy et al. | 117—2 X |
| 2,616,983 | 11/1952 | Zworykin et al. | |
| 2,644,766 | 7/1953 | Levine | 117—2 X |
| 2,833,612 | 5/1958 | Almy | 8—7 |
| 3,105,769 | 10/1963 | Ellerin | 117—2 |

MURRAY KATZ, *Primary Examiner.*